(12) United States Patent
Lee

(10) Patent No.: US 12,548,797 B2
(45) Date of Patent: Feb. 10, 2026

(54) ELECTROLYTE AND LITHIUM METAL SECONDARY BATTERY COMPRISING SAME

(71) Applicant: LG ENERGY SOLUTION, LTD., Seoul (KR)

(72) Inventor: Jeongbeom Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 608 days.

(21) Appl. No.: 17/768,200

(22) PCT Filed: Jan. 12, 2021

(86) PCT No.: PCT/KR2021/000419
§ 371 (c)(1),
(2) Date: Apr. 11, 2022

(87) PCT Pub. No.: WO2021/215622
PCT Pub. Date: Oct. 28, 2021

(65) Prior Publication Data
US 2024/0120546 A1    Apr. 11, 2024

(30) Foreign Application Priority Data

Apr. 20, 2020   (KR) .................. 10-2020-0047502

(51) Int. Cl.
| | | |
|---|---|---|
| *H01M 10/0569* | (2010.01) | |
| *H01M 4/505* | (2010.01) | |
| *H01M 4/525* | (2010.01) | |
| *H01M 10/052* | (2010.01) | |
| *H01M 10/0568* | (2010.01) | |

(52) U.S. Cl.
CPC ....... *H01M 10/0569* (2013.01); *H01M 4/505* (2013.01); *H01M 4/525* (2013.01); *H01M 10/052* (2013.01); *H01M 10/0568* (2013.01); *H01M 2300/0034* (2013.01); *H01M 2300/004* (2013.01)

(58) Field of Classification Search
CPC .. H01M 10/0569; H01M 4/505; H01M 4/525; H01M 10/052; H01M 10/0568; H01M 2300/0034; H01M 2300/004; H01M 4/382; H01M 10/0567; H01M 2300/0037; Y02E 60/10

See application file for complete search history.

(56) References Cited

U.S. PATENT DOCUMENTS

| | | | |
|---|---|---|---|
| 2011/0223490 A1* | 9/2011 | Andou | H01M 10/0569 429/332 |
| 2013/0108932 A1 | 5/2013 | Onozaki et al. | |
| 2013/0316229 A1 | 11/2013 | Sawa et al. | |
| 2016/0190650 A1 | 6/2016 | Seo et al. | |
| 2016/0344063 A1* | 11/2016 | Chang | H01M 4/525 |
| 2017/0018805 A1 | 1/2017 | Yoshida | |
| 2017/0098858 A1 | 4/2017 | Kim et al. | |
| 2019/0198932 A1 | 6/2019 | Newhouse et al. | |
| 2019/0198933 A1* | 6/2019 | Newhouse | H01M 4/13 |
| 2020/0091559 A1 | 3/2020 | Noguchi et al. | |

FOREIGN PATENT DOCUMENTS

| | | |
|---|---|---|
| CN | 103339784 A | 10/2013 |
| CN | 106169610 A | 11/2016 |
| CN | 110720156 A | 1/2020 |
| JP | 2011-187234 A | 9/2011 |
| JP | 5942849 B2 | 6/2016 |
| KR | 10-2014-0116078 A | 10/2014 |
| KR | 10-2014-0116873 A | 10/2014 |
| KR | 10-2016-0081109 A | 7/2016 |
| KR | 10-2016-0136686 A | 11/2016 |
| KR | 10-2016-0138087 A | 12/2016 |
| KR | 10-2017-0039580 A | 4/2017 |
| KR | 10-2018-0057437 A | 5/2018 |
| KR | 10-2020-0029625 A | 3/2020 |
| WO | 2019-126360 A1 | 6/2019 |

* cited by examiner

*Primary Examiner* — Lisa S Park
(74) *Attorney, Agent, or Firm* — Bryan Cave Leighton Paisner LLP

(57) ABSTRACT

An electrolyte for a lithium metal secondary battery, the electrolyte comprising a lithium salt including lithium bis(fluorosulfonyl)imide, and a non-aqueous solvent including 1,2-(1,1,2,2-tetrafluoroethoxy)ethane; a cyclic fluorinated carbonate; and a solvent containing at least one selected from the group consisting of a chain carbonate, a chain ester, and a chain ether, wherein the 1,2-(1,1,2,2-tetrafluoroethoxy)ethane is contained in an amount of 5% to 30% by volume based on the total volume of the non-aqueous solvent.

7 Claims, No Drawings

ELECTROLYTE AND LITHIUM METAL SECONDARY BATTERY COMPRISING SAME

CROSS-REFERENCE TO RELATED APPLICATION(S)

This application is a National Stage Application of International Application No. PCT/KR2021/000419 filed on Jan. 12, 2021, which claims priority to Korean Patent Application No. 10-2020-0047502 filed on Apr. 20, 2020, the disclosure of which is incorporated herein by reference in its entirety.

FIELD OF DISCLOSURE

The present disclosure relates to an electrolyte that can be applied to lithium metal secondary batteries using lithium metal as an anode active material to improve the battery life characteristics.

BACKGROUND

With the rapid development of the electronics, communications and computer industries, the fields of application of energy storage technology is expanding to camcorders, mobile phones, notebook computers, PCs, and even electric vehicles. Accordingly, development of a high-performance secondary battery that are lightweight, long-lasting, and highly reliable is underway.

Among secondary batteries that are currently available, lithium secondary batteries developed in the early 1990's have drawn particular attention due to their advantages of higher operating voltages and much higher energy densities than conventional aqueous electrolyte-based batteries, for example, Ni—MH, Ni—Cd, and sulfuric acid-lead batteries.

Lithium metal, carbon-based material, silicon, and the like are used as negative electrode active materials of lithium secondary batteries, and among them, lithium metal has an advantage for obtaining the highest energy density, and thus, continuous research is being conducted.

A lithium electrode using lithium metal as an active material is generally manufactured by using a flat copper or nickel foil as a current collector and adhering a lithium foil thereon. Alternatively, a method of using a lithium foil itself as a lithium electrode without a separate current collector, or using only a current collector without a lithium foil to assemble a battery, then charging and discharging the battery to form a lithium metal layer, and using it as a negative electrode, and the like are known.

Such lithium batteries are variously named as lithium metal batteries and lithium-free batteries and the like, but are generally referred to as lithium metal secondary batteries in that lithium metal is used as a negative electrode.

However, because of high reactivity of the lithium metal, volume expansion on the negative electrode during battery charge/discharge, and a surface non-uniformity phenomenon occurring in the process of electrodeposition and peeling of lithium metal on the negative electrode, the lithium metal secondary battery containing the lithium metal electrode has a problem that a stable interface is not formed between the electrolyte and the lithium metal electrode, and a continuous decomposition reaction of the electrolyte solution occurs. The above-said side reaction of the electrolytes not only increases the battery resistance rapidly, but also depletes the electrolyte and available lithium in the battery, and thus being a major cause of deterioration of the battery life.

SUMMARY

The present disclosure is designed to solve the problems of the prior art, and therefore it is an object of the present disclosure to provide a non-aqueous electrolyte having excellent stability with respect to lithium metals so that side reactions of electrolyte can be suppressed and life performance is improved According to one embodiment of the present disclosure, there is provided an electrolyte comprising a lithium salt and a non-aqueous solvent, wherein the lithium salt includes lithium bis(fluorosulfonyl)imide, the non-aqueous solvent includes 1,2-(1,1,2,2-tetrafluoroethoxy)ethane; a cyclic fluorinated carbonate; and a solvent containing at least one selected from the group consisting of a chain carbonate, a chain ester, and a chain ether, and the 1,2-(1,1,2,2-tetrafluoroethoxy)ethane is contained in an amount of 5% to 30% by volume based on the total volume of the non-aqueous solvent.

In some embodiments, the 1,2-(1,1,2,2-tetrafluoroethoxy)ethane may be contained in an amount of 10% to 20% by volume based on the total volume of the non-aqueous solvent.

In one embodiment, the cyclic fluorinated carbonate may include at least one selected from the group consisting of fluoroethylene carbonate, difluoroethylene carbonate, and trifluoromethylethylene carbonate.

In some embodiments, the cyclic fluorinated carbonate may be contained in an amount of 5 to 30% by volume based on the total volume of the non-aqueous solvent, and specifically, may be contained in an amount of 10 to 20% by volume based on the total volume of the non-aqueous solvent.

In some embodiment, the chain carbonate may include at least one selected from the group consisting of dimethyl carbonate, diethyl carbonate, dipropyl carbonate, ethyl methyl carbonate, methyl propyl carbonate, and ethyl propyl carbonate.

In some embodiment, the chain ester may include at least one selected from the group consisting of methyl acetate, ethyl acetate, propyl acetate, methyl propionate, ethyl propionate, and propyl propionate.

In some embodiment, the chain ether may include at least one selected from the group consisting of dimethyl ether, diethyl ether, dipropyl ether, methylethyl ether, methylpropyl ether, and ethylpropyl ether.

In some embodiment, the at least one solvent selected from the group consisting of the chain carbonate, the chain ester, and the chain ether may include at least one selected from the group consisting of dimethyl carbonate, diethyl carbonate, methyl propionate, ethyl propionate, dimethyl ether, and diethyl ether.

In some embodiment, the lithium bis(fluorosulfonyl)imide may be contained in an amount of 20 to 50% by weight of the total weight of the electrolyte, and specifically, may be contained in an amount of 25 to 40% by weight of the total weight of the electrolyte.

According to another embodiment of the present disclosure, there is provided a lithium metal secondary battery comprising: a positive electrode; a negative electrode formed of only a negative electrode current collector, or of a lithium metal coated on the negative electrode current collector, or of a lithium metal; a separator interposed between the positive electrode and the negative electrode; and the electrolyte.

In some embodiment, the positive electrode may include a positive electrode active material comprising lithium, nickel-cobalt-manganese-based compound or lithium cobalt oxide.

DETAILED DESCRIPTION

The terms used herein are used only to describe exemplary embodiments, and are not intended to limit the present disclosure. singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Since the present disclosure may be modified in various forms, and may have various embodiments, the following exemplary embodiments are illustrated and described in detail. However, this is not intended to limit the present disclosure to specific embodiments, and the present disclosure should be construed to encompass various changes, equivalents, and substitutions within the technical scope and spirit of the invention.

An electrolyte for a lithium metal secondary battery according to one embodiment of the present disclosure is an electrolyte comprising a lithium salt and a non-aqueous solvent, wherein the lithium salt includes lithium bis(fluorosulfonyl)imide, the non-aqueous solvent includes 1,2-(1,1,2,2-tetrafluoroethoxy)ethane; a cyclic fluorinated carbonate; and a solvent containing at least one selected from the group consisting of a chain carbonate, a chain ester, and a chain ether, and the 1,2-(1,1,2,2-tetrafluoroethoxy)ethane is contained in an amount of 5% to 30% by volume based on the total volume of the non-aqueous solvent.

The present inventors have conducted intensive studies on the composition of a non-aqueous electrolyte suitable for use in lithium metal secondary batteries containing lithium metal as a negative electrode active material, and as a result, have found that when the electrolyte solution satisfying the composition of the present disclosure is applied to a lithium metal battery, it exhibits significantly improved stability compared to the conventional electrolyte solution, and improves battery life, high rate charging performance, and high temperature performance, thereby completing the invention. The above-mentioned effects of the present disclosure can be ensured only when the combination of the lithium salt and the solvent is satisfied, and it is difficult to achieve when any one of the above components is deficient.

The 1,2-(1,1,2,2-tetrafluoroethoxy)ethane (TFEE) is a material having the following structural formula, and is used as a solvent in the non-aqueous electrolyte solution of the present disclosure.

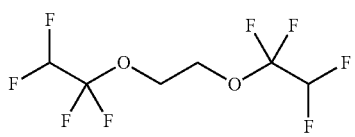 [SMILES: FC(F)C(F)(F)OCCOC(F)(F)C(F)F]

TFEE can suppress side reactions between lithium metal and electrolyte to improve battery life characteristics, and reduces the viscosity of electrolyte to improve the impregnation properties of electrodes and separators, thereby improving lithium ion conductivity.

However, as a result of experiments by the present inventors, the above effect can be exhibited when the content of TFEE is 5% to 30% by volume based on the total volume of the non-aqueous solvent used in the electrolyte.

When the TFEE content exceeds 30% by volume, outside the above said range, which is too large, it shows that the lifespan improving effect is rather reduced. Further, when the TFEE content is too small, less than 5% by volume with respect to the total volume of the non-aqueous solvent, the above said effect cannot be obtained. Therefore, in order to secure the effect of improving the stability of the electrolyte and improving the battery life characteristics, TFEE is preferably contained in an amount of 10% by volume or more, and 25% by volume or less, or 20% by volume or less based on the total volume of the non-aqueous solvent.

In the present disclosure, a cyclic fluorinated carbonate is included together with the TFEE in the non-aqueous solvent.

The cyclic fluorinated carbonate is not particularly limited as long as it is a compound in which at least one hydrogen is substituted with fluorine in a cyclic carbonate commonly used as a solvent for an electrolyte. Specifically, the cyclic fluorinated carbonate may include at least one selected from the group consisting of fluoroethylene carbonate, difluoroethylene carbonate, and trifluoromethylethylene carbonate, preferably, fluoroethylene carbonate.

The cyclic fluorinated carbonate is preferably contained in an amount of 5% by volume or more, or 10% by volume or more, and 30% by volume or less, or 20% by volume or less based on the total volume of the non-aqueous solvent.

If the content of the cyclic fluorinated carbonate is less than 5% by volume, the effect of suppressing side reactions of the electrolyte cannot be secured, and if the content exceeds 30% by volume, the lithium salt may not be sufficiently dissociated and thus the ionic conductivity of the electrolyte may not be secured.

Meanwhile, in addition to TFEE and the cyclic fluorinated carbonate, the electrolyte of the present disclosure includes at least one solvent selected from the group consisting of a chain carbonate, a chain ester, and a chain ether (hereinafter, referred to as a chain solvent) in the non-aqueous solvent. The electrolyte solution prepared by mixing such a chain solvent, TFEE, and a cyclic fluorinated carbonate together with LiFSI salt exhibits excellent stability with respect to lithium metal, but such an effect cannot be achieved with an electrolyte solution composed of a cyclic solvent, TFEE, cyclic fluorinated carbonate, and LiFSI, which can be confirmed from the results of Examples described later.

The chain solvent may be used in an amount of 50% by volume or more, or 60% by volume or more based on the total volume of the non-aqueous solvent of the electrolyte solution, and may be used in an amount of 85% by volume or less and 80% by volume or less.

Alternatively, the chain solvent may fill the rest excluding the TFEE and the cyclic fluorinated carbonate.

That is, in the electrolyte solution according to an embodiment of the present disclosure, the non-aqueous solvent may be composed of TFEE, a cyclic fluorinated carbonate, and a chain solvent. In other words, the electrolyte solution may not contain any additional solvents other than the above said solvents.

As the chain solvent, the chain solvent usually used for the electrolyte solution for a lithium secondary battery can be used without limitation.

Specifically, the chain carbonate may include at least one selected from the group consisting of dimethyl carbonate, diethyl carbonate, dipropyl carbonate, ethyl methyl carbonate, methyl propyl carbonate, and ethyl propyl carbonate.

The chain ester may include at least one selected from the group consisting of methyl acetate, ethyl acetate, propyl acetate, methyl propionate, ethyl propionate, and propyl propionate.

The chain ether may include at least one selected from the group consisting of dimethyl ether, diethyl ether, dipropyl ether, methylethyl ether, methylpropyl ether, and ethylpropyl ether.

The at least one solvent selected from the group consisting of the chain carbonate, the chain ester, and the chain ether may include at least one selected from the group consisting of dimethyl carbonate, diethyl carbonate, methyl propionate, ethyl propionate, dimethyl ether, and diethyl ether.

Meanwhile, the electrolyte for a lithium metal secondary battery of the present disclosure includes lithium bis(fluorosulfonyl)imide (LiFSI) as a lithium salt.

The content of LiFSI is preferably 20 to 50% by weight, or 25 to 40% by weight, or 31 to 40% by weight of the total weight of the electrolyte. If the LiFSI content is less than 20% by weight, there is a problem that corrosion of the positive electrode current collector (e.g., aluminum foil) and elution of the positive electrode active material transition metal occur, and if the content exceeds 50% by weight, there may be problems of performance deterioration due to low ionic conductivity and deterioration of impregnation property due to high viscosity, which are not preferable.

The electrolyte of the present disclosure may include only the LiFSI as a lithium salt, or may further contain other lithium salts in addition to LiFSI. The lithium salt contained in addition to LiFSI is preferably used in an amount of 0.1 to 3% by weight based on the total weight of the electrolyte solution, to secure the life performance of the lithium metal battery.

The lithium salts that can be included in addition to LiFSI can include LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, LiC$_4$BO$_8$, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi and the like, which are commonly used in electrolyte.

In this case, the total concentration of LiFSI and other lithium salts in the electrolyte is preferably 1.8 M (mol/L) or more. In such a high salt concentration, side reactions between lithium metal and electrolyte can be suppressed, and the effect of preventing corrosion of the positive electrode current collector and elution of the transition metal of the positive electrode active material can be secured. In some embodiments, the concentration of the lithium salt in the electrolyte may be 2.0 M or more, or 2.3 M or more, and 4.0 M or less, or 3.0 M or less. If the concentration of the lithium salt is too high, there may be problems of performance deterioration due to low ionic conductivity and deterioration of impregnation property due to high viscosity. Therefore, the concentration is adjusted appropriately within the above range.

The electrolyte for a lithium metal secondary battery of the present disclosure contains TFEE in an amount of 5% to 30% by volume based on the total volume of the non-aqueous solvent, and additionally includes the cyclic fluorinated carbonate, and the chain solvent, and includes LiFSI as a lithium salt, thereby exhibiting excellent stability with respect to the lithium metal electrode, and showing the effect of remarkably reducing side reactions during battery operation. Accordingly, when the electrolyte solution of the present disclosure is applied to a lithium metal secondary battery, the battery life characteristics, high rate charging performance, and high temperature performance can be improved.

According to another embodiment of the present disclosure, there is provided a lithium metal secondary battery including the electrolyte. Specifically, the lithium metal secondary battery includes a positive electrode, a negative electrode formed of only a negative electrode current collector, or of a lithium metal coated on the negative electrode current collector, or of a lithium metal; a separator interposed between the positive electrode and the negative electrode; and the electrolyte.

Here, the positive electrode includes a positive electrode active material layer coated on a positive electrode current collector. The positive electrode active material layer may include a positive electrode active material, a binder, and optionally a conductive material.

The positive electrode current collector is not particularly limited so long as it has conductivity while not causing a chemical change in the battery, and for example, may be formed of stainless steel, aluminum, nickel, titanium, sintered carbon, and a material formed by surface-treating a surface of aluminum or stainless steel surface with carbon, nickel, titanium, silver, or the like. At this time, the positive electrode current collector may have fine protrusions and recesses at a surface thereof to increase adhesion of the positive electrode active material, and may be used in various forms such as a film, a sheet, a foil, a net, a porous body, a foaming body, and a non-woven fabric structure. As the positive electrode active material, a compound known in the art as a compound capable of reversibly intercalating and deintercalating lithium may be used.

For example, lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium-nickel-manganese-based oxide (e.g., LiNi$_{1-y}$Mn$_y$O$_2$ (where $0<Y<1$), LiMn$_{2-z}$Ni$_z$O$_4$ (where $0<Z<2$), etc.), lithium-nickel-cobalt-based oxide (e.g., LiNi$_{1-y1}$Co$_{y1}$O$_2$ (where $0<Y1<1$), etc.), lithium-manganese-cobalt-based oxide (e.g., LiCo$_{1-y2}$Mn$_{y2}$O$_2$ (where $0<Y2<1$), LiMn$_{2-z1}$Co$_{z1}$O$_4$ (where $0<Z1<2$), etc.), lithium-nickel-manganese-cobalt-based oxide (e.g., Li(Ni$_p$Co$_q$Mn$_{r1}$)O$_2$ (where $0<p<1$, $0<q<1$, $0<r1<1$, $p+q+r1=1$) or Li(Ni$_{p1}$Co$_{q1}$Mn$_{r2}$)O$_4$ (where $0<p1<2$, $0<q1<2$, $0<r2<2$, $p1+q1+r2=2$), etc.), or lithium-nickel-cobalt-transition metal (M) oxide (e.g., Li(Ni$_{p2}$Co$_{q2}$Mn$_{r3}$M$_{S2}$)O$_2$ (where M is at least one selected from the group consisting of Al, Fe, V, Cr, Ti, Ta, Mg and Mo, p2, q2, r3 and s2 are atomic fractions of each independent element, $0<p2<1$, $0<q2<1$, $0<r3<1$, $0<s2<1$, $p2+q2+r3+s2=1$), etc.), and the like may be mentioned, and any one or two or more of these compounds may be included.

However, when the electrolyte according to the present disclosure is used, specifically, when the positive electrode active material contains a lithium nickel-cobalt-manganese compound or a lithium cobalt oxide, the effect of preventing side reactions of the electrolyte and improving life characteristics according to the present disclosure is achieved, which is more preferable.

The binder is used for bonding of the electrode active material and the conductive material and bonding to the current collector. Non-limiting examples of such binders include polyvinylidene fluoride (PVDF), polyvinyl alcohol (PVA), polyacrylic acid (PAA), polymethacrylic acid (PMA), polymethyl methacrylate (PMMA) polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluorine rubber, various copolymers thereof, and the like.

The conductive material is used for further improving the conductivity of the electrode active material. Such a conductive material is not particularly limited as long as it has conductivity without causing a chemical change in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

The method of manufacturing the positive electrode is not particularly limited. For example, they can be manufactured by a process in which an active material, a binder, and optionally a conductive material are mixed in an organic solvent to prepare an active material slurry, and the prepared active material slurry is coated and dried onto a current collector, and optionally, subjected to a compression molding on a current collector.

As the organic solvent, those in which an active material, a binder and a conductive material can be uniformly dispersed and which are easily evaporated are preferred. Specifically, N-methylpyrrolidone, acetonitrile, methanol, ethanol, tetrahydrofuran, water, and isopropyl alcohol may be exemplified, but are not limited thereto.

The negative electrode is a lithium metal negative electrode using lithium metal as a negative electrode active material. The lithium metal negative electrode used when assembling a lithium metal secondary battery may be formed of only a negative electrode current collector, may be a form containing a lithium metal coated on the negative electrode current collector, or may be made of lithium metal.

The negative electrode current collector is not particularly limited as long as it has high conductivity without causing chemical changes to the battery. For example, copper, stainless steel, aluminum, nickel, titanium, calcined carbon, or a material formed by surface-treating a surface of aluminum or stainless steel with carbon, nickel, titanium, silver, or the like, aluminum-cadmium alloy, and the like may be used. In addition, various forms such as films, sheets, foils, nets, porous bodies, foams, non-woven fabrics, etc. may be used as the form of a film, sheet, foil, net, porous body, foam, and non-woven fabric in which fine irregularities are formed on the surface or are not formed can be used. For example, a copper foil may be used as the negative electrode current collector, but is not limited thereto.

The thickness of the current collector is not particularly limited, but is preferably 5 to 100 μm, and more preferably 5 to 50 μm. If the thickness of the current collector is less than 5 μm, it can be difficult to handle in the process, and if the thickness exceeds 100 μm, the thickness and weight of the battery will increase unnecessarily, and the energy density may decrease, which may affect the battery performance. Therefore, the above said range is desirable.

If an electrode formed of only a current collector is used as the negative electrode at the time of assembling the battery, lithium ions transferred from the positive electrode by the initial charge and discharge after battery assembly are irreversibly plated on the negative electrode current collector to form a lithium metal layer, and subsequently the lithium metal layer may function as the negative electrode active material layer.

Alternatively, a negative electrode containing lithium metal as an active material may be used from the battery assembly, wherein a method of coating the lithium metal onto the negative electrode current collector is not particularly limited. As an example, a method of laminating a thin film of lithium metal onto a current collector and then rolling it, a method for electrolytic or electroless plating of lithium metal on the current collector, or the like can be used. At this time, the thickness of the lithium metal layer of the negative electrode is not particularly limited, but may be 10 μm or more, or 20 μm or more, and 50 μm or less, or 40 μm or less.

Meanwhile, in the case of a lithium metal negative electrode formed of only lithium metal, the thickness is not particularly limited, but may be 10 μm or more, or 20 μm or more, and 50 μm or less, or 40 μm or less.

The separator separates the positive electrode and the negative electrode, and provides a passage for lithium ions to move, and any separator may be used without particular limitation as long as it is generally used as a separator in a lithium secondary battery. That is, a separator having excellent moisture-retention ability for an electrolyte while having low resistance to the movement of electrolyte ions can be used.

Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof may be used. In addition, a conventional porous nonwoven fabric, for example, a nonwoven fabric made of high melting point glass fiber, polyethylene terephthalate fiber, or the like may also be used. In addition, in order to secure heat resistance or mechanical strength, a coated separator containing a ceramic component or a polymer material may be used, and optionally, a single layer or a multilayer structure may be used. For example, it is selected from glass fibers, polyester, Teflon, polyethylene, polypropylene, polytetrafluoroethylene (PTFE), or combinations thereof, and may be a non-woven fabric or a woven fabric.

For example, a polyolefin-based polymer separator such as polyethylene and polypropylene, or a separator including a coating layer containing a ceramic component or a polymer material to secure heat resistance or mechanical strength can be used. These separators may be used in a single layer or multilayer structure. In one embodiment, as the separator, a separator prepared by coating a ceramic coating material containing ceramic particles and an ionic binder polymer on both surfaces of a polyolefin-based polymer substrate may be used.

The method of manufacturing a lithium metal secondary battery disclosure is not particularly limited, and in an example, the lithium metal secondary battery can be manufactured by a process in which the positive electrode, the separator, and the negative electrode are sequentially stacked to prepare an electrode assembly, which is placed in a battery case, and an electrolyte solution is injected into the upper part of the case, and sealed with a cap plate and a gasket.

The shape of the lithium metal secondary battery as described above is not particularly limited, and may be, for example, a jelly-roll type, a stack type, a stack-folding type (including a stack-Z-folding type), or a lamination-stack type.

The lithium metal secondary battery manufactured in this way exhibits significantly less side reactions between the lithium metal electrode and the electrolyte, and thus can exhibit excellent battery life characteristics and high rate charging performance.

Hereinafter, preferred examples will be described to help understanding the present disclosure, but the following examples are presented for illustrative purposes only. It will be apparent to those skilled in the art that various modifications and variations can be made without departing from the spirit or scope of the invention. Thus, it is intended that the present disclosure covers the modifications and variations of the invention provided they come within the scope of the appended claims and their equivalents.

EXAMPLES

Examples 1 to 3 and Comparative Examples 1 to 3: Manufacture of Lithium Metal Secondary Battery (1) Manufacture of Positive Electrode NCM 811 ($LiNi_{0.8}Co_{0.1}Mn_{0.1}O_2$) was used as a positive electrode active material, carbon black was used as a conductive material, polyvinylidene fluoride (PVdF) was used as a binder, and N-methylpyrrolidone was used as a solvent. Thereby, a positive active material slurry having a weight ratio of active material: conductive material: binder of 96:2:2 was produced. Then, the positive electrode active material slurry was coated on both sides of an aluminum foil having a thickness of 12 μm, and roll-pressed and dried to manufacture a positive electrode having a loading of 3.8 mAh/cm².

(2) Manufacture of Negative Electrode

A lithium metal foil having a thickness of 20 μm was laminated on one surface of a copper foil having a thickness of 8 μm and roll-pressed to manufacture a lithium metal negative electrode.

(3) Manufacture of Electrolyte

The electrolyte solutions of Examples and Comparative Examples were prepared with the composition shown in Table 1 below. In Table below, DMC is dimethyl carbonate (linear carbonate), FEC is fluoroethylene carbonate, and TFEE is 1,2-(1,1,2,2-tetrafluoroethoxy)ethane. In addition, in the following Table, the content of lithium salt is weight % based on the total weight of the electrolyte solution, and the content of each solvent is a volume % of each solvent based on the total volume of the non-aqueous solvent.

TABLE 1

| | Lithium salt (wt %) | Solvent (vol %) | | | Lithium salt concentration |
|---|---|---|---|---|---|
| | LiFSI | DMC | FEC | TFEE | (M) |
| Comparative Example 1 | 38 | 80 | 20 | 0 | 2.7 |
| Comparative Example 2 | 21 | 40 | 10 | 50 | 1.6 |

TABLE 1-continued

| | Lithium salt (wt %) | Solvent (vol %) | | | Lithium salt concentration |
|---|---|---|---|---|---|
| | LiFSI | DMC | FEC | TFEE | (M) |
| Comparative Example 3 | 36 | 75 | 0 | 25 | 2.7 |
| Example 1 | 32 | 64 | 16 | 20 | 2.3 |
| Example 2 | 25 | 50 | 33 | 17 | 1.8 |
| Example 3 | 55 | 64 | 16 | 20 | 3.5 |

(4) Assembling of Battery

The separator and the negative electrode of (2) were laminated on both surfaces of the positive electrode of (1) such that negative electrode/separator/positive electrode/separator/negative electrode were sequentially laminated and thereby preparing a pouch-type bicell having a capacity of 125 mAh. At this time, a separator coated with alumina having a thickness of 2.5 μm on both sides of a 7 μm-thick polyethylene fabric was used.

200 μl (1.6 ul/mAh) of each electrolyte solution prepared in (3) was injected into the pouch to manufacture the batteries of Examples 1 and 2 and Comparative Examples 1 to 3.

Experimental Example: Evaluation of Life Characteristics at Room Temperature (25° C.) and High Temperature (45° C.)

For the cells of each of the Examples and Comparative Examples, charging and discharging were repeated at 25° C. with a standard charge/discharge current density of 0.2 C/2.0 C, a charge termination voltage of 4.25 V, and a discharge termination voltage of 2.5 V. At this time, the cycle at which the capacity retention rate represented by the following Equation 1 becomes 80% was recorded, and shown in Table 2 below. In addition, the same experiment was performed on the batteries of Example 2 and Comparative Example 1 at 45° C. and the results are shown in Table 2 below.

Capacity retention rate(%)=(discharge capacity at the nth cycle/discharge capacity at the first cycle)*100 [Equation 1]

TABLE 2

| | 25° C. life performance (capacity retention rate 80%) | 45° C. life performance (capacity retention rate 80%) |
|---|---|---|
| Comparative Example 1 | 78 | 66 |
| Comparative Example 2 | 49 | 50 |
| Comparative Example 3 | 26 | 29 |
| Example 1 | 182 | 215 |
| Example 2 | 111 | 108 |
| Example 3 | 98 | 85 |

Referring to Table 2, it is confirmed that the electrolyte solution of Examples including TFEE exhibits remarkably improved room-temperature and high-temperature life characteristics compared to Comparative Example 1. However, it can be seen from Comparative Example 2 that the life improving effect cannot be sufficiently ensured when the TFEE content is excessively high. In addition, it can be seen from Comparative Example 3 that the effect according to the present disclosure cannot be achieved if FEC is not contained. On the other hand, comparing Example 1 with Examples 2 and 3, it can be seen that when appropriate amount of FEC and LiFSI is not included in the electrolyte to which TFEE is applied, the effect according to the present disclosure cannot be achieved.

INDUSTRIAL APPLICABILITY

The electrolyte for a lithium metal secondary battery of the present disclosure has excellent stability with respect to lithium metal and thus has few side reactions of the electrolyte, whereby it can be applied to a lithium metal secondary battery to improve battery life characteristics, high rate charging performance, and high temperature performance.

The invention claimed is:

1. An electrolyte for a lithium metal secondary battery, the electrolyte comprising a lithium salt and a non-aqueous solvent,
wherein the lithium salt includes lithium bis (fluorosulfonyl) imide,
wherein the non-aqueous solvent includes 1,2-(1,1,2,2-tetrafluoroethoxy) ethane; fluoroethylene carbonate (FEC); and dimethyl carbonate (DMC),
wherein the 1,2-(1,1,2,2-tetrafluoroethoxy) ethane is contained in an amount of 10% to 20% by volume based on the total volume of the non-aqueous solvent;
wherein both the FEC and DMC combined are contained in an amount of 80% to 90% by volume based on the total volume of the non-aqueous solvent.

2. The electrolyte according to claim 1,
wherein the FEC is contained in an amount of 5 to 30% by volume based on the total volume of the non-aqueous solvent.

3. The electrolyte according to claim 2,
wherein the FEC is contained in an amount of 10 to 20% by volume based on the total volume of the non-aqueous solvent.

4. The electrolyte according to claim 1,
wherein the lithium bis (fluorosulfonyl) imide is contained in an amount of 20 to 50% by weight of the total weight of the electrolyte.

5. The electrolyte according to claim 4,
wherein the lithium bis (fluorosulfonyl) imide is contained in an amount of 25 to 40% by weight of the total weight of the electrolyte.

6. A lithium metal secondary battery comprising:
a positive electrode;
a negative electrode formed of only a negative electrode current collector, or of a lithium metal coated on the negative electrode current collector, or of a lithium metal;
a separator between the positive electrode and the negative electrode; and
the electrolyte according to claim 1.

7. The lithium metal secondary battery according to claim 6,
wherein the positive electrode includes a positive electrode active material comprising lithium, nickel-cobalt-manganese-based compound or lithium cobalt oxide.

* * * * *